United States Patent Office 3,621,707
Patented Nov. 23, 1971

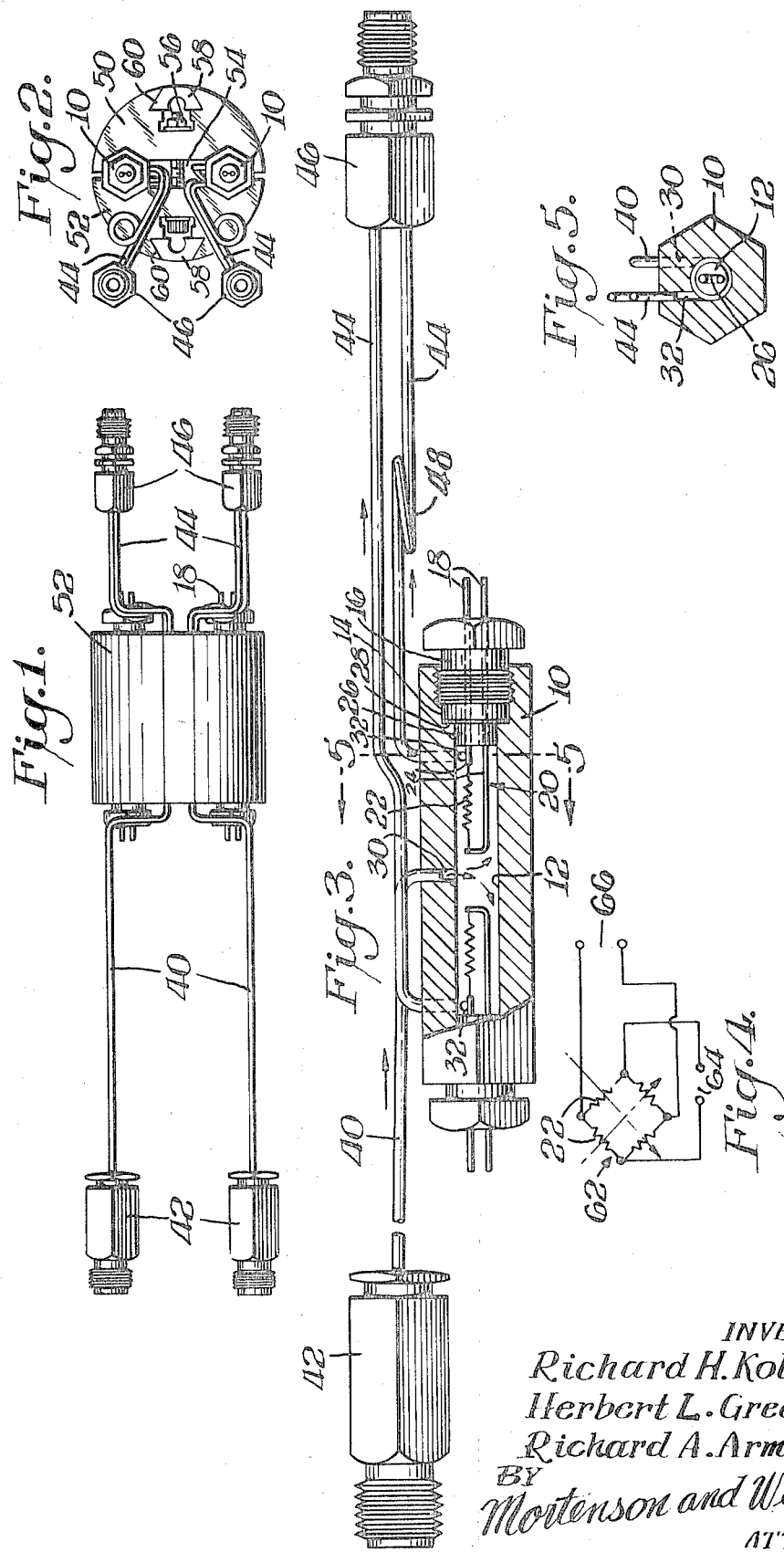

3,621,707
THERMAL CONDUCTIVITY DETECTOR ASSEMBLY
Richard H. Kolloff, West Chester, Pa., Herbert L. Greenhaus, Burlington, Vt., and Richard A. Arms, Sunnyvale, Calif., assignors to Hewlett-Packard Company, Palo Alto, Calif.
Filed July 8, 1969, Ser. No. 839,834
Int. Cl. G01n 27/18
U.S. Cl. 73—27                     1 Claim

ABSTRACT OF THE DISCLOSURE

A pair of separate thermal conductivity detector cells, each containing two detecting elements, are clamped between two mating housing halves which provide a large heat sink. Each of the detector cells include a single passage in a housing symmetrically disposed about the axis of the passage to facilitate matching like cells for use in the detector assembly. The detecting elements are coaxially disposed at both ends of each cell. Gas is introduced at the central portion of each passage and permitted to split and flow over the respective detecting elements and exit at the respective ends of the passage. Conduits for conducting the gas to and from the respective detector cells pass through an open space between the two mating housing halves which aids in reducing deleterious thermal effects and facilitates construction of the assembly.

BACKGROUND OF THE INVENTION

This invention relates to an improved thermal conductivity detector assembly and, more particularly, to a device for measuring the thermal conductivity of gases which device is simple to construct.

Thermal conductivity detectors have been used for many years to measure the thermal conductivity of gas mixtures. Differences in the thermal conductivity of gases can be used to identify the individual components and other characteristics of gas mixtures. Such detectors are commonly employed to determine the concentration of the various separated components eluting, for example, from a gas chromatograph. In such application the gas stream eluting from the gas chromatograph column, which stream contains the separated components of the sample gas mixture under test, is passed through the thermal conductivity measuring cell.

The measuring cell contains an electrically energized current-carrying, temperature sensitive transducer or detecting element. As the carrier gas and sample components flow through the cell and pass over and around the electrically energized detecting element, they transmit heat from the detecting element to the surrounding cell walls. The rate at which this heat is removed from the element is a function of the thermal conductivity of the carrier gas and sample components. Hence, the detecting element attains a definitive temperature which is a function of the carrier gas and sample components passing through the cell at a particular moment in time. Under these circumstances the detecting element assumes a particular value of electrical resistance preferably within its linear range of operation. This detecting element is coupled to a suitable measuring device, usually a bridge-type circuit, which relates the electrical behavior of the detecting element to the concentraton of the component passing through the cell at that particular time.

Various detecting elements are used in such cells. Among those that find particularly widespread usage are thermistors and resistance wires having a temperature-resistance characteristic. All of these elements are electrically resistive in nature and the value of electrical resistance which they exhibit is dependent upon the temperature of the environment in which they are located and the current being passed through the filament.

Although used for many years, thermal conductivity detectors still present many problems to the instrument designer as well as the user. Among these problems are those of slow response to changes in gas composition due to dead spaces within the cell itself and the lack of a positive fluid flow system. Other problems are those of constructing the detector itself and, in multi-element detectors, matching the several elements such that their electrical responses are similar. Furthermore, in those bridges using four separate elements for maximum sensitivity, if care is not taken to provide absolute uniformity of the respective gas flow paths, the gases often reach the different elements at different points in time. When the gases do not reach corresponding arms of the bridge simultaneously, peak broadening occurs in the response characteristic and sensitivity is lost.

Heat dissipation from the detecting elements must be good and must be symmetrical. Lacking such symmetry, the response of the cell will tend to vary, causing baseline drift of the detector output signal and an increased noise level.

It is, therefore, an object of this invention to obviate many of the disadvantages of the prior art thermal conductivity detectors.

Another object of this invention is to provide an improved thermal conductivity detector that provides a relatively sensitive response and uniformity of thermal characteristics.

BRIEF DESCRIPTION OF THE INVENTION

A preferred embodiment of this invention includes a pair of detector cells sandwiched within a mating pair of blocks which form a heat sink for the assembly. Each of the detector cells forms an elongated passage. A pair of the detecting elements are positioned substantially coaxially of and at either end of the passage. Gas is introduced into the passage at a central point so that it splits and flow simultaneously over each of the detecting elements and exits at the ends of the passage. Preferably the gas is introduced in a tangential manner such that a spiral flow about the respective detecting elements is created thereby to reduce turbulence in the vicinity of the elements. With this arrangement, once a pair of detecting elements are matched to their environment in a given cell it is relatively simple matter to match cells to make up a four element detector bridge. A cavity between the blocks through which the gas conduits can pass simplifies construction and assembly of detectors.

BRIEF DESCRIPTION OF THE DRAWINGS

The novel features that are considered characteristic of this invention are set forth with particularity in the appended claims. The invention itself, however, both as to its organization and method of operation as well as additional objects and advantages thereof will be best understood from the following description, given for illustrative purposes only when read in connection with the accompanying drawings in which:

FIG. 1 is a plan view of a thermal conductivity detector assembly constructed in accordance with a preferred embodiment of this invetnion;

FIG. 2 is an end view of the assembly illustrated in FIG. 1;

FIG. 3 is a side elevation view of one of the thermal conductivity detectors employed in the assembly illustrated in FIG. 1 with the detector portion shown partially cut away;

FIG. 4 is a schematic circuit diagram of the electrical connections for the detecting elements constituting the assembly of FIG. 1; and FIG. 5 is a view taken through the section 5—5 of the illustration of FIG. 3 of the detector cell.

DESCRIPTION OF THE PREFERRED EMBODIMENT

The thermal conductivity detector assembly illustrated in FIGS. 1 and 2 may perhaps be best understood by first referring to FIGS. 3 and 5 which show one of the two pair of cells that are employed in the assembly. Thus, in FIG. 3 there is seen one of the cell housings 10 which typically is a heat absorbing body having an axial bore 12 which defines an elongated passage for the flow of gas. The heat absorbing body may be formed of aluminum, stainless steel, or other material preferably having good thermal conductivity. The housings are illustrated as hexagonal in cross-section which is preferred, but cylindrical, or other shaped housings having a symmetrical cross-section with respect to the axis of the passage 12 may be employed as well. This provides symmetrical heat dissipation from the detecting elements and the physical and electrical characteristics of the detecting elements and their environment may be quantiated. This facilitates matching pairs of cartridges or housings to form four element detector assemblies.

Each end of the bore 12 is counterbored as at 14 and internally threaded to accommodate a retaining plug or nut 16. The retaining nut 16 is hollow to allow the wires 18 from a detecting element 20 to pass to the outside of the cell. The detecting element 20 is illustrated as having a temperature sensitive, electrically resistive element 22 substantially coaxially supported by wire supports 24 which in turn are mounted in a non-conductive material such as glass or ceramic potted within a support washer 26. The support washer 26 is flanged to fit into the stepped portion 28 formed by the counterbore 14 and is seated by the retaining nut 16 when screwed into position.

Thus mounted, the two detecting elements 20 in each cell are part of an assembly which includes the temperature responsive element 22 substantially lineally and coaxially disposed within and at either end of the bore 12. Gas is introduced into the passageway provided by the bore 12 at a central lengthwise point as illustrated by the radial bore 30. The radial bore 30, in a preferred form of the invention as illustrated in FIG. 5, is not truly radial but rather is directed to be tangential to the bore 12 to introduce the gas into the bore in a tangential manner. This permits the gas to flow through the passageway about the coaxially disposed detecting element 20 in a spiral or vortical manner.

The outlets from the passageway, formed by the bore 12, are at either end of the passageway adjacent the mounting assembly 26–16 for the detecting elements. The outlets to the passageway are formed by bores 32 which also are tangentially directed to the passageway to receive the spirally flowing gas and permit it to exit from the passageway wih reduced turbulence. Suitable conduits 40, 44 are provided to connect the inlet and outlet passages formed by the bores 30 and 32. Thus an inlet conduit 40 has one end secured as by soldering or otherwise to the inlet bore 30 and the other end secured to a suitable tubing connector 42. The tubing connector 42 and others used throughout are of conventional design and may be for example, those sold by the Crawford Fitting Company under the trademark "Swagelok." The conduits employed may be stainless steel or other suitable tubing. In like manner, conduits 40 and 44 are connected to the respective outlet bores or passageways 32 and thence to a tubing connector 46 in which the two conduits are joined. The conduits 44 are each formed of equal lengths so that their resistance to gas flow is the same. This permits the split of the gases occurring within the passageway 12 to be equal. The rate of gas flow thus prevails in both halves of the cell housing 10. The equality in length is compensated for by the loop 48 which is formed in the lower (in the drawing) conduit 44 during assembly.

The complete detector assembly according to this invention is formed utilizing two of the split flow detector housings illustrated in FIGS. 3 and 5 to form a four element detector or bridge. This assembly may be seen most clearly in the illustration of FIGS. 1 and 2. In these figures it will be seen that the two detector housings 10 are clamped between mating D-shaped halves 50 and 52, respectively, which together forms a cylindrical type housing. The mating halves 50 and 52 are formed so that they enclose the two detector housings 10 and leave a space 54 between the two. It is through this space 54 that the conduits 40 and 44 are brought out to the exterior without contacting the housing halves 50 an 52. In this way, the gas flows to the detector and also from the detector are isolated from the thermal effects that are often produced by the flowing gases through the conduits. Further, the assembly and construction of the detector are greatly simplified. A bolt and nut 56 is used to retain the housing halves 50 and 52 together which then act as a suitable heat sink to accommodate the four detecting elements making up the detector assembly. To complete the assembly, key type inserts 58 may be inserted into longitudinal slots 60 formed in the periphery of the halves 50 and 52 to accommodate the bolt and nut 56, to provide a cylindrical exterior to the assembly and facilitate heat transfer through the halves 50 and 52. The enire assembly may in actual usage be wrapped with a heating element to maintain the housing at the desired temperature when the detector is in use. This temperature is readily transferred through the housing halves 50 and 52 to what is illustrated as hexagonal shaped detector cell housings 10. The housing halves may be formed of any suitable material such as aluminum, stainless steel, or other material preferably having a good thermal conductivity.

The detecting elements 22 are connected electrically through the wires 18 to form a conventional bridge circuit such as that illustrated in FIG. 4 generally by the reference numeral 62. The bridge circuit 62 may be energized by a suitable source of electrical energy which may be connected to the bridge input terminals 64. One of each of the pairs of detecting elements 22 are connected in series and each of the series combinations connected. across the bridge input terminals 64. The junctions between the respective pairs of serially connected detecting elements 22 form the output terminals 66 of the bridge. The detecting elements 22 are selected to have substantially identical characteristics and may be any of the well known resistive type elements whose resistance varies as a function of temperature. Such elements may include thermistors or thermal conductivity filaments of known type. Additionally the bridge 62 may be provided with suitable span resistors and balancing potentiometers (not shown) as may be necessary and desirable. The dashed lines passing through the bridge configuration 62 are used to denote those opposite pairs of detecting elements 22 which occupy the same split flow housing 10. It may be seen that such detecting elements are electrically positioned in opposite arms of the bridge 62.

The advantages of this invention are many. Firstly, the detector is relatively easy to construct since all of the parts may be readily and quickly machined. Further, by the use of the air space 54 between the halves of the outside housing, a simple construction of the individual split flow cells is possible. Assembly of the unit is readily accomplished. The two split flow cells are isolated from one another more effectively by the air space 54 and hence their temperature is more easily maintained constant as is desirable for sensitive operation. Furthermore, the oppositely disposed detecting elements 22 in the full bridge 62 are each disposed within the same gas passageway and are exposed simultaneously and rapidly to the same incoming gas mixture. This gas mixture is applied through the inlet passageway 30 and split to direct half of the incoming gas along and around each detecting element 22. This flow is spiral having the many advantages described in the earlier filed co-pending application S.N.

528,254 filed Feb. 17, 1966 by John W. Dooley. The turbulence and convection effects normally occuring in the gas streams are reduced.

A particular problem encountered in most thermal conductivity detectors is obviated by this invention. This problem is caused by the difficulty of matching the four individual detecting elements or filaments to obtain a quiescently balanced bridge. It is extremely difficult to match four separate filaments. With this invention the filaments are matched two by two as each cell is assembled. The hexagonal shaped split-flow housing provides a symmetrical and efficient path for the heat of the coaxially disposed filaments 22 to dissipate. This hexagonal symmetry permits the attainment of cells having more uniform thermal characteristics which results in improved baseline stability of the detector in both isothermal and programmed temperature operation. This matching and coaxial placement in the symmetrical cells tend to fix the environment of the filaments and hence their electrical characteristics. Having done this, it is a simple matter to select pairs of split-flow housings or cells 10 that match and can be used together in a bridge that is quiescently balanced. This provides saving of not only filaments, since more can be used, but also time of assembly.

While the invention has been disclosed herein in connection with certain structural and procedural details, it is clear that changes, modifications or equivalents can be used by those skilled in the art; accordingly, such changes within the principles of the invention are intended to be included within the scope of the claim.

What is claimed is:

1. A thermal conductivity detector assembly for measuring the thermal conductivity of a gas mixture comprising:

a pair of heat absorbing cartridges each defining an elongated passage, each of said cartridges having a separate lineal detecting element positioned substantially coaxially within and at each end portion of said elongated passage, a gas inlet passage located at the central axial portion of said elongated passage, and a gas outlet passage located at each said end portion, whereby gas flow occurs along each detecting element from the center inlet to each end portion outlet and each detecting element is subjected simultaneously to a gas mixture having the same characteristics, each of said detecting elements having quantitative electrical and thermal response characteristics substantially independent of one another and determined when each said element is in position in the corresponding one of said cartridges;

a pair of mating heat absorbing bodies adapted to enclose and position said pair of cartridges in parallel relationship with an air gap therebetween to accommodate said inlet and outlet passages without contacting said pair of bodies, and means for coupling said detecting elements in a balanced bridge circuit having two pairs of adjacent arms, each pair of arms including selected detector elements in different ones of said cartridges, said selected detector elements having like quantitative electrical and thermal characteristics.

References Cited

UNITED STATES PATENTS

| | | | |
|---|---|---|---|
| 2,116,239 | 5/1938 | Hebler | 73—27 |
| 3,007,333 | 11/1961 | Chadenon | 73—27 |
| 3,084,536 | 4/1963 | McNabb | 73—27 |
| 3,474,660 | 10/1969 | Dooley | 73—27 |
| 3,486,364 | 12/1969 | Luft | 73—27 |

OTHER REFERENCES

Dayna: "Gas Analysis," pp. 30–36, 1948.

RICHARD C. QUEISSER, Primary Examiner

E. J. KOCH, Assistant Examiner